Feb. 12, 1963  C. DELP  3,077,166
WEED DESTROYING IMPLEMENT
Filed March 31, 1961
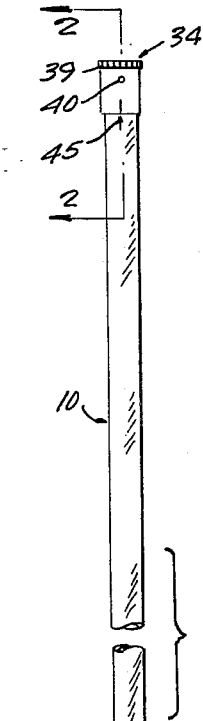
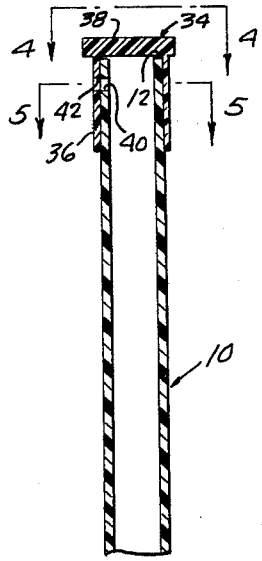
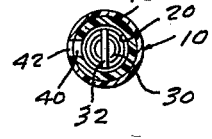
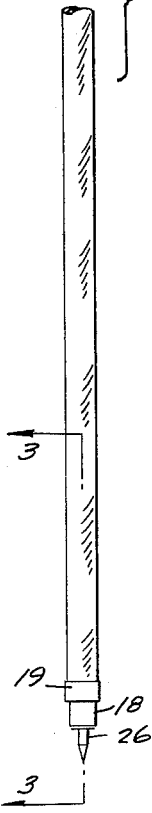
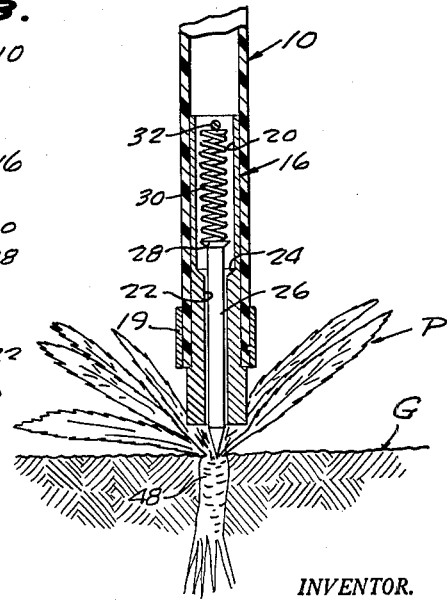
FIG. 1. FIG. 2. FIG. 3. FIG. 4. FIG. 5. FIG. 6.
INVENTOR.
CHRISTOPHER DELP,
BY
McMorrow, Berman & Davidson
ATTORNEYS.

3,077,166
WEED DESTROYING IMPLEMENT
Christopher Delp, 4420 Harbor View Ave.,
Oakland 19, Calif.
Filed Mar. 31, 1961, Ser. No. 99,957
2 Claims. (Cl. 111—7.3)

This invention relates to a novel and improved weed destroying implement of the plant injector type.

The primray object of the invention is the provision of a more efficient, more practical, and more easily used device of the kind indicated, which involves a tubular combined handle and container rod for containing weed-destroying fluid, having ground-pressure actuated injector valve means on one end, and a removable filler cap on its other end, the cap having an air vent hole which is adapted to be registered with an air vent hole in the rod in order to provide for access of air to the interior of the rod to enable flow of fluid therefrom through valve means, when open, and the cap being adapted to be moved to another position on the rod wherein the cap closes the rod vent hole, so as to prevent escape of fluid from the interior of the rod, at either end thereof.

Another object of the invention is the provision of a simpler and lighter weight device of the character indicated above, which is composed of a small number of simple and easily assembled parts, and which can be made in serviceable and attractive forms, at relatively low cost, from a variety of readily available material, including plastics.

Other important objects and advantageous features of the invention will be apparent from the following description and the accompanying drawings, wherein, for purposes of illustration only, a specific form of the invention is set forth in detail.

In the drawings:

FIGURE 1 is a contracted side elevation of a device of the present invention;

FIGURE 2 is an enlarged fragmentary longitudinal section taken on the line 2—2 of FIGURE 1, showing the filler cap positioned with its vent hole registered with the vent hole in the container rod;

FIGURE 3 is a fragmentary longitudinal section, on the scale of FIGURE 2, taken on the line 3—3, and showing the valve means in closed position;

FIGURE 4 is a top plan view taken from the line 4—4 of FIGURE 2;

FIGURE 5 is a transverse section taken on the line 5—5 of FIGURE 2; and

FIGURE 6 is a fragmentary schematic and sectional view showing the device applied to a weed growing in the ground and the valve means in open fluid discharging position.

Referring in detail to the drawings, wherein like numerals designate like parts throughout the several views, the illustrated device comprises an elongated tubular and preferably cylindrical combined handle and container rod 10, which is preferably of uniform diameter, and has an open upper end 12 and an open lower end 14. The rod 10 is preferably made of suitable rigid non-corrosive plastic material, but can be made of other suitable materials, the plastic material having the advantages of light weight, low cost, ease of manufacture, and resistance to rust and acid corrosion.

Ground-pressure operated fluid dispensing means for fluid contained within the rod 10, comprises an elongated tube 16 which is closely fitted into the lower end of the rod 10, and is fixed against rotation and endwise movement therein, as by a good friction fit in the rod 10. An enlarged diameter head 18, on the lower end of the tube 16, bears against the lower end 14 of the rod. If desired, further securement of the tube 16 in place in the rod 10 can be obtained by installing a clamping ring 19 around the rod 10 at its lower end, which compresses the side wall of the rod around the tube 16.

The tube 16 has a compound axial bore extending therethrough, which is composed of a relatively large diameter upper portion 20 and a smaller diameter lower portion 22. The bore portions 20 and 22 meet to define a shoulder which is bevelled to provide a valve seat 24. An injector pin 26, which is longer than the lower bore portion 22 extends loosely and slidably through the bore portion 22 and has an enlarged diameter bevelled valve head 28 on its upper end located above the valve seat 24. An expanding coil spring 30, smaller in diameter than and positioned lengthwise in the upper bore portion 20 of the tube 16, has one end engaged with the valve head 28 and its other end engaged with a diametrical pin 32, which extends across the upper end of the tube 16 and is fixed thereto. The spring 30 is long enough and strong enough to project the injector pin 26 downwardly beyond the lower end of the tube 16, and maintain the valve head 28 firmly in the valve seat 24, so as to prevent escape of weed destroying fluid from the interior of the rod 10, through the lower bore portion 22, around the injector pin 26, while the device is not in use.

A filler cap 34 is removably and rotatably engaged on the upper end 12 of the rod 10. The cap 34 comprises a cylindrical sidewall 36 having a relatively close fit on the exterior of the rod 10, and a top wall 38, having a knurled peripheral edge 39, which is preferably larger in diameter than the sidewall 36 and is of substantial thickness, to provide a convenient and strong handle for manipulating the cap 34. At a point close to the upper end 12 of the rod 10 the rod sidewall is provided with an air vent hole 40, and the cap sidewall 36 is provided with an air vent hole 42, which is adapted to be registered with the air vent hole 40, as shown in FIGURES 2 and 5, in order to provide for access of outside air to the interior of the rod 10, necessary to provide for gravity flow of fluid therefrom through the valve tube 16, when the valve head 28 of the injector pin 26 is elevated off the seat 24, as shown in FIGURE 6. When the device is not in use, the cap 34 is rotated, in either direction, relative to the rod 10, so as to put an imperforate part of the cap sidewall 36 over the rod vent hole 40 and seal the same. A position indicating pointer 44 can be provided on the upper surface of the cap top wall 38, as shown in FIGURE 4, which is aligned with the cap sidewall vent hole 40 and is adapted to be aligned with an indicator 45 on the rod 10, below the cap 34.

In operation, and as shown in FIGURE 6, the cap 34 having been rotated on the rod 10 to align the vent holes 40 and 42, and the rod 10 being held in the hands, a point 46, provided on the lower end of the injector pin 26, is inserted in the ground G, so as to reach the roots 48 of a weed plant P, and pressed downwardly with sufficient pressure to overcome the resistance of the spring 30 and unseat the valve head 28 from the valve seat 24, so that fluid flows down around the pin 26 and enters the roots 48. When it is decided that sufficient fluid has been thus applied to the roots 48, downward pressure on the rod 10 is relaxed, so that the spring 30 reseats the valve head 28 and cuts off the flow of fluid thereto, whereat the device can then be carried, without risk of spillage of fluid, to any other desired location, and is ready for another weed destroying injection.

Although there has been shown and described herein a preferred form of the invention, it is to be understood that the invention is not necessarily confined thereto, and that any change or changes in the structure of and in the relative arrangement of components thereof are contemplated as being within the scope of the invention as defined by the claims appended hereto.

What is claimed is:

1. A weed destroying implement comprising an elongated hollow tubular rod having an open upper end and an open lower end, there being an air vent hole in said rod inwardly of and adjacent the upper end thereof, a filler cap closing the upper end of said rod and removably and rotatably engaged on the upper end of said rod, said cap having a top wall extending over and engaging the upper end of said rod, and a cylindrical side wall depending from said top wall and closely fitting about the exterior of the adjacent portion of said rod, said side wall being provided with an air vent hole registrable with the vent hole in said rod responsive to rotation of said cap in the proper direction, and valve means closing the lower open end of said rod and controlling the flow of liquid from said rod, said valve means comprising a hollow tube extending into and closely fitted into the lower open end of said rod, an enlarged head depending from said tube and having a portion projecting out of the lower end of said rod and engaging the lower end of said rod, said head being provided with an axial bore extending therethrough, an injector pin slidably and loosely engaged through said bore and extending beyond the projecting portion of said head, a valve head on said pin and normally closing and seating over the adjacent end of said bore, and a coil spring disposed within said tube and having one end bearing against said valve head and having the other end affixed to said tube adjacent the end within said tube for biasing said valve head into closing relation with respect to the adjacent end of said bore, said pin being actuable upon application of pressure to the projecting end to shift the valve head out of its closing relation with respect to the adjacent end of said bore against the action of said spring to permit the flow of liquid out of said rod through said bore.

2. The implement according to claim 1 which includes in addition a clamping ring extending about said rod and compressing said rod against said head of said tube.

References Cited in the file of this patent

UNITED STATES PATENTS

| | | |
|---|---|---|
| 1,499,446 | Code | July 1, 1924 |
| 1,836,259 | Leon | Dec. 15, 1931 |
| 1,836,686 | Schling | Dec. 15, 1931 |
| 1,861,254 | Arens | May 31, 1932 |
| 1,960,738 | Giezentanner | May 29, 1934 |
| 2,055,266 | Thomas | Sept. 22, 1936 |
| 2,209,731 | Holmes | July 30, 1940 |
| 2,689,068 | Lunn | Sept. 14, 1954 |
| 2,817,189 | Esmay | Dec. 24, 1957 |

FOREIGN PATENTS

| | | |
|---|---|---|
| 708,127 | France | Apr. 27, 1931 |
| 700,353 | Great Britain | Dec. 2, 1953 |